United States Patent
Versaevel et al.

(10) Patent No.: US 10,487,738 B2
(45) Date of Patent: Nov. 26, 2019

(54) FRONT LIP OF A TURBOFAN ENGINE NACELLE COMPRISING HOT-AIR BORES UPSTREAM FROM ACOUSTIC PANELS

(71) Applicant: SAFRAN NACELLES, Gonfreville l'Orcher (FR)

(72) Inventors: Marc Versaevel, Le Havre (FR); Arnaud Delehouze, Sainneville sur Seine (FR); Laurence Lemains, Saint Sauveur d'Emalleville (FR); Pierre-François Behaghel, Le Havre (FR)

(73) Assignee: SAFRAN NACELLES, Gonfreville L'Orcher (FR)

( * ) Notice: Subject to any disclaimer, the term of this patent is extended or adjusted under 35 U.S.C. 154(b) by 386 days.

(21) Appl. No.: 15/403,658

(22) Filed: Jan. 11, 2017

(65) Prior Publication Data

US 2017/0122204 A1     May 4, 2017

Related U.S. Application Data

(63) Continuation of application No. PCT/FR2015/051925, filed on Jul. 10, 2015.

(30) Foreign Application Priority Data

Jul. 11, 2014 (FR) .................................... 14 56743

(51) Int. Cl.
*F02C 7/047* (2006.01)
*B64D 15/04* (2006.01)
(Continued)

(52) U.S. Cl.
CPC .............. *F02C 7/047* (2013.01); *B64D 15/04* (2013.01); *B64D 29/00* (2013.01); *B64D 33/02* (2013.01);
(Continued)

(58) Field of Classification Search
CPC .... B64D 2033/0233; B64D 2033/0206; B64D 15/04; F02C 7/047
See application file for complete search history.

(56) References Cited

U.S. PATENT DOCUMENTS

| 4,674,714 A | * | 6/1987 | Cole | ....................... B64D 15/04 138/104 |
| 4,738,416 A | * | 4/1988 | Birbragher | .............. B64D 15/04 244/134 B |

(Continued)

FOREIGN PATENT DOCUMENTS

| EP | 0913326 | 4/2002 |
| FR | 2637251 | 4/1990 |

(Continued)

OTHER PUBLICATIONS

International Search Report for International Application PCT/FR2015/051925, dated Oct. 21, 2015.

*Primary Examiner* — Peter J Bertheaud
(74) *Attorney, Agent, or Firm* — Burris Law, PLLC

(57) ABSTRACT

A front lip of a turbofan engine nacelle is provided, defined at the rear by a partition wall, the lip comprising an annular de-icing space including a tube for supplying hot air in order to de-ice the outer walls thereof, said lip also including acoustic panels arranged on the wall thereof substantially radially facing the axis of the nacelle. The front lip includes hot-air outlet bores/piercings which are arranged between the front end of the lip and said acoustic panels, which allow a flow of hot air, from said annular space, forming a substantially regular film which covers said acoustic panels with a boundary layer in order to heat said acoustic panels.

13 Claims, 2 Drawing Sheets

(51) Int. Cl.
*B64D 29/00* (2006.01)
*B64D 33/02* (2006.01)
*F02C 7/045* (2006.01)
*F01D 25/10* (2006.01)
*F01D 25/24* (2006.01)

(52) U.S. Cl.
CPC ............ *F01D 25/10* (2013.01); *F01D 25/24* (2013.01); *F02C 7/045* (2013.01); *B64D 2033/0206* (2013.01); *B64D 2033/0233* (2013.01); *F05D 2220/323* (2013.01)

(56) References Cited

U.S. PATENT DOCUMENTS

| | | | | |
|---|---|---|---|---|
| 5,088,277 A | * | 2/1992 | Schulze | B64D 15/04 244/134 R |
| 6,698,691 B2 | * | 3/2004 | Porte | B64D 15/04 244/134 B |
| 6,848,656 B2 | * | 2/2005 | Linton | B64D 15/04 244/134 C |
| 8,448,901 B2 | * | 5/2013 | Porte | B64D 15/04 244/134 B |
| 8,602,360 B2 | * | 12/2013 | Porte | B64D 15/04 244/134 B |
| 8,640,986 B2 | * | 2/2014 | Surply | B64D 33/02 244/204 |
| 9,010,084 B2 | * | 4/2015 | Chelin | B64D 15/04 137/15.1 |
| 2002/0179773 A1 | | 12/2002 | Breer et al. | |

FOREIGN PATENT DOCUMENTS

| | | |
|---|---|---|
| FR | 2840879 | 8/2005 |
| FR | 2917067 | 8/2009 |
| FR | 2952032 | 4/2012 |
| FR | 2980776 | 8/2014 |

\* cited by examiner

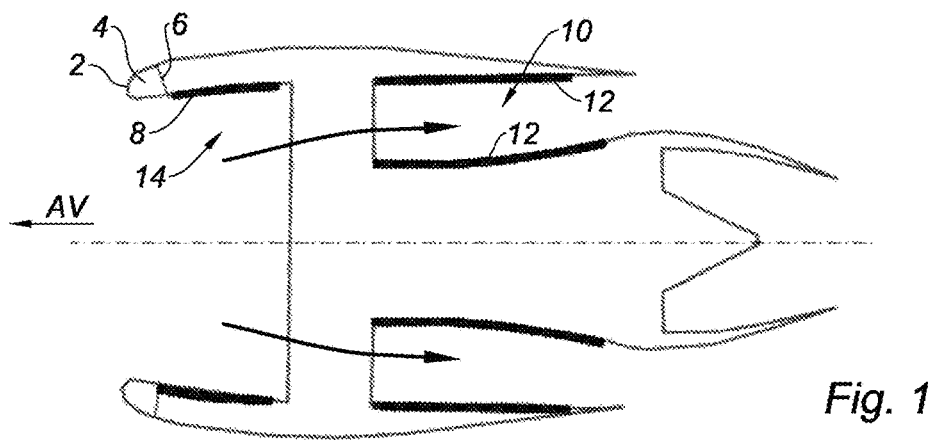
Fig. 1
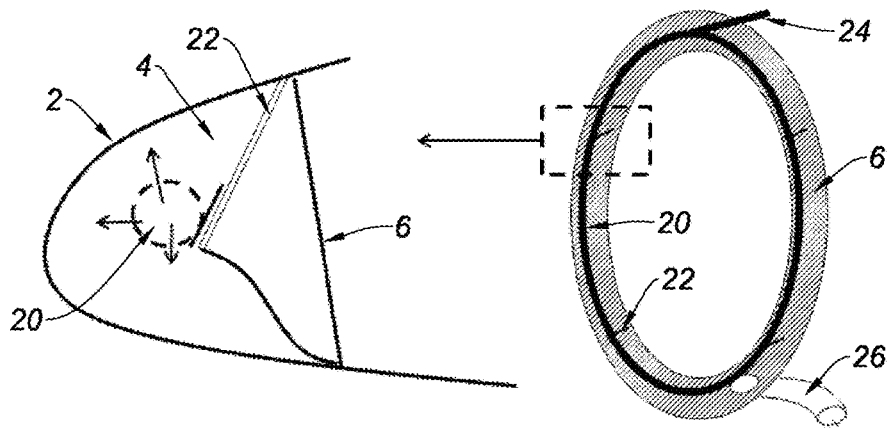
Fig. 2b
PRIOR ART
Fig. 2a
PRIOR ART
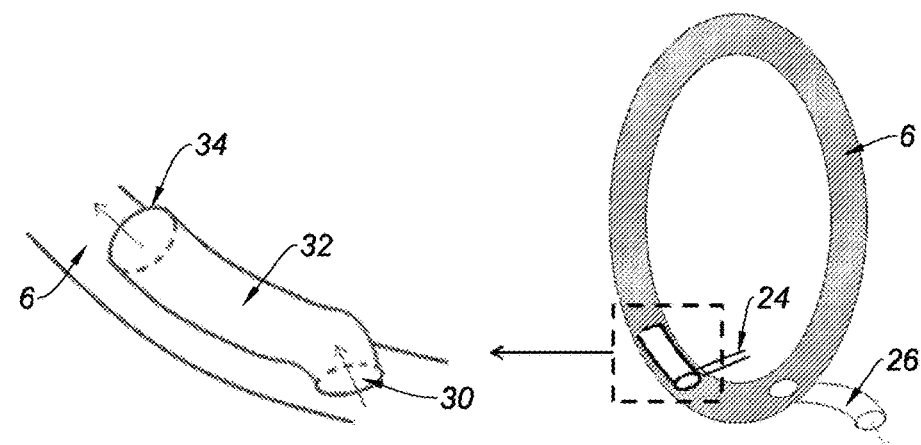
Fig. 3b
PRIOR ART
Fig. 3a
PRIOR ART

FRONT LIP OF A TURBOFAN ENGINE NACELLE COMPRISING HOT-AIR BORES UPSTREAM FROM ACOUSTIC PANELS

CROSS-REFERENCE TO RELATED APPLICATIONS

This application is a continuation of International Application No. PCT/FR2015/051925, filed on Jul. 10, 2015, which claims the benefit of FR 14/56743 filed on Jul. 11, 2014. The disclosures of the above applications are incorporated herein by reference.

FIELD

The present disclosure concerns a front lip of a turbojet engine nacelle including a de-icing system, as well as a method for supplying this lip with hot air, and a turbojet engine nacelle equipped with such a front lip.

BACKGROUND

The statements in this section merely provide background information related to the present disclosure and may not constitute prior art.

The leading edges of aircraft, in particular the front lips of the air inlets of turbojet engine nacelles forming rounded flanges turned forwards, may show, under some weather conditions such as the crossing of clouds with a low temperature, the formation of frost which ends up constituting blocks of ice.

Thus, a modification of the aerodynamic profile of the nacelle is obtained, which may disturb the air supply and the proper operation of the engine, and the performance of this engine is decreased. In addition, a detachment of blocks of ice which enter inside the turbojet engine and damage fan blades, may result. Flight authorizations under icing conditions require the presence of a de-icing system.

A known type of de-icing or anti-icing systems, presented in particular in the documents EP-B1-0913326 or US-A1-20020179773, includes a circular tube surrounding the nacelle, which supplies with hot air collected on the turbojet engine, the internal volume of the front lip of this nacelle in order to heat its external walls.

Moreover, in order to reduce the acoustic emissions of the turbojet engines, some internal walls of the nacelle are fitted with sandwich panels including a central core presenting honeycomb-shaped cells, which is covered by a tight internal rear skin, and by an external front skin turned toward the sound source, which is perforated or porous.

Thus, the open cells constitute a Helmholtz resonator type device, which contributes to significantly reduce the acoustic emissions.

The central core of the sandwich panel may include one single thickness of cells, or two thicknesses separated by a micro-perforated medial skin, so as to improve the acoustic performance of the panel.

In particular, this type of acoustic panel is disposed on the internal walls of the annular cold air flow path, in the case of a bypass turbojet engine, as well as on the internal wall of the upstream air inlet.

In particular, in the documents of the prior art disclosed hereinabove, the radially inner surfaces of the leading edge lip, turned toward the axis of the nacelle, are fitted starting from the front of the lip, with this type of acoustic panels. It will be noted that fitting as far upstream as possible from the air inlet of the nacelle, in particular in the substantially cylindrical internal volume, gives improved acoustic performances of this nacelle.

Nonetheless, as the acoustic panels constitute a thermal insulator, small perforations are then made on the internal skin of these panels, in order to obtain a hot air flow rate which passes through the panels so as to heat the external wall from the air circulating inside this lip.

However, this method poses different problems, in particular the required hot air flow rate is hardly compatible with the acceptable perforation of the internal skin, and the acoustic performance of these panels is reduced.

In addition, a loss of the aerodynamic efficiency of the nacelle is obtained, in particular with a bailer effect where the external air enters inside the first upstream cells passing through the acoustic panel, arriving in the internal volume of the lip, and then coming out via the last downstream cells by passing again through this panel.

SUMMARY

The present disclosure provides a front lip of a turbojet engine nacelle, including an annular de-icing volume receiving a hot air supply for performing a de-icing of its external walls, this lip further comprising acoustic panels disposed over its wall turned substantially toward the axis of the nacelle, remarkable in that it includes hot air outlet piercings which are disposed between the front end of the lip, and the acoustic panels.

One advantage of this front lip is that a layer of hot air coming out from the piercings is obtained, it covers the acoustic panels disposed just downstream of these piercings, thereby performing a de-icing of the panels in an effective manner. Thus, it is possible to dispose such acoustic panels as far upstream as possible from the lip, almost up to its front end, which gives good acoustic performance, with a reduced loss of the aerodynamic qualities of the nacelle.

The front lip of the nacelle according to the present disclosure may further include one or more of the following features, which may be combined together.

Advantageously, the piercings are disposed just upstream of the acoustic panels. Thus, a hot air flow rate, which comes out from the annular volume as close as possible to these acoustic panels, is obtained.

Advantageously, the acoustic panels cover a major portion of the length along the axis of the nacelle, of the external surface of the annular volume turned toward this axis. In this manner, a considerable coverage of the surface by these acoustic panels is performed, resulting in a better attenuation of the noises.

Advantageously, the surface of the front lip, which does not include any acoustic panel, is heated by direct contact with the hot air circulating inside the annular volume. In this manner, a conventional de-icing method is used for this portion.

Advantageously, the annular volume is separated by internal radial partition walls into several angular sectors. Each of these angular sectors allows improving the air flow rate of its sector, so as to obtain a substantially uniform distribution of the hot air layer over the internal periphery of the front lip.

In particular, each angular sector may include a distinct supply tube.

The present disclosure also provides a method for supplying an annular hot air volume of a nacelle front lip comprising any one of the preceding features, which adjusts the hot air flow rate delivered inside this volume based on the operating conditions of the turbojet engine.

Advantageously, during the take-off of the aircraft, the method delivers a lower hot air injection flow rate.

Advantageously, during the descent of the aircraft, the method delivers a more significant hot air injection flow rate.

The present disclosure also provides a turbojet engine nacelle including a front lip presenting an annular de-icing volume receiving a hot air supply, this front lip comprising any one of the preceding features.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a schematic axial section of a turbojet engine nacelle including acoustic panels disposed in the annular flow path;

FIGS. 2a and 2b are respectively overall and detail views of a front lip including a first de-icing system, made according to the prior art;

FIGS. 3a and 3b are respectively overall and detail views of a front lip including a second de-icing system, made according to the prior art;

Figure 4:
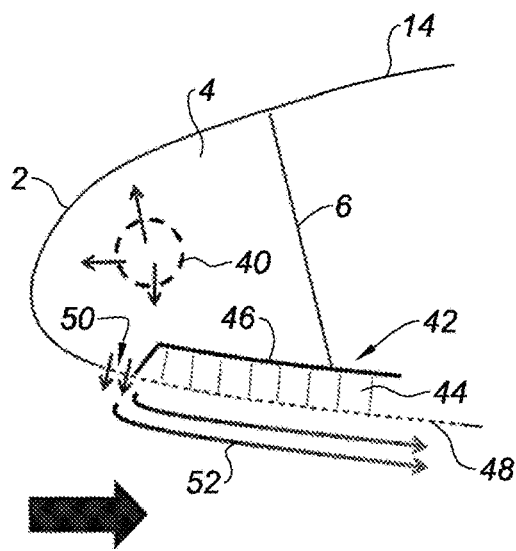
FIG. 4 is a schematic axial section of a front lip including a de-icing system, made according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows the nacelle including, on the front side indicated by the arrow "AV" upstream of the substantially cylindrical front shroud 14, an annular volume 4 located inside the front lip 2, constituting a de-icing compartment which is closed by a rear partition wall 6.

The nacelle includes a fan which sends a cold secondary air flow in an annular flow path 10, disposed downstream.

The internal surface 8 of the front shroud 14 as well as the outer and inner structures 12 of the annular cold air flow path 10, receive acoustic panels including a honeycomb core presenting a closed rear wall and a front wall disposed at the surface which is porous or pierced, in order to absorb the noises emitted by the motor.

FIGS. 2a and 2b show the annular volume 4 including a circular tube 20 disposed substantially at the center of this volume, which is supported by several radial plates 22 fastened to the rear partition wall 6 so as to hold it in this position.

The circular tube 20 includes, at a first end, a hot air inlet 24 and, at its opposite end, an outlet 26 of the air which has cooled after having heated the annular internal volume 4 by contact with this tube acting as a heater. Thus, the front lip 2 comprising its wall heated from the inside, allows melting the frost or the ice which might be deposited over its external surface.

FIGS. 3a and 3b show a variant of another type of hot air supply of the internal annular volume 4, comprising an air inlet piercing 30 throughout the rear partition wall 6, and a tube disposed tangentially 32 presenting an outlet orifice 34, which makes the air turn inside this annular volume.

Thus, a good distribution of the hot air is obtained in the entire annular volume 4.

FIG. 4 shows the internal annular volume 4 including a system for distributing hot air in the entire volume 40, which may consist of a known type disclosed hereinabove.

The internal surface of the shroud 14 turned toward the center of the nacelle, includes acoustic panels 42 which extend upstream on the front lip 2, covering a major portion of the length along the axis of the nacelle, of the external surface of the annular volume 4 turned toward this axis.

Each acoustic panel 42 includes a honeycomb core 44 presenting a tight internal skin 46, and a porous or pierced external skin 48 which is disposed in the extension of the front portion of the lip 2 in order to obtain an aerodynamic continuity.

The front lip 2 includes just upstream of the acoustic panels 42 a series of piercings 50 distributed over the annular circumference, which enable a hot air flow rate forming a substantially uniform film suctioned downstream, and covering these acoustic panels with a boundary layer 52 of air in order to heat them up so as to avoid the formation of frost or to perform de-icing.

In particular, the hot air film generates a deflection of the droplets of air arriving upstream, which push them away from the acoustic panel 42, as well as an evaporation of the droplets having passed through this film, which have been deposited over this panel.

The pattern of the piercings 50 and the shape of these piercings, in particular the diameter, the distribution, the taper or the inclination of these piercings, are adjusted so as to optimize the thickness of the hot air boundary layer 52, and to promote the deflection of the trajectory of the drops with respect to the wall of the nacelle.

It will be noted that the cells 44 of the acoustic panels 42 including only outward piercings, cannot constitute a bailer making the hot air flow coming from the outside recirculate toward the inside of the annular volume 4.

The upstream portion of the front lip 2 and the portion turned radially outwards, which do not present any acoustic panels 42, are heated in a conventional manner by circulation of hot air inside the annular volume 4.

Thus, a compromise is obtained allowing placing the acoustic panels 42 as far upstream as possible on the lip of the nacelle 2, thereby providing good acoustic performance, with an effective de-icing system consuming a limited hot air flow rate, and with aerodynamic losses which remain low.

In order to obtain a hot air boundary layer 52 including an appropriate flow rate, allowing it to remain permanently stuck on the acoustic panel 42, it is interesting to adjust the hot air flow rate based on the operating conditions of the turbojet engine. Indeed, if the boundary layer 52 is detached from the acoustic panel 42, de-icing of this panel is no longer effective.

In particular, during the take-off of the aircraft, a high hot air pressure provided by the compressor of the turbojet engine is obtained, and the depression at the level of the lip 2 is considerable, a low hot air injection flow rate will then be achieved.

During the descent, a lower hot air pressure provided by the compressor is obtained, and the depression at the level of the lip 2 is also low, a significant hot air injection flow rate will then be achieved.

Figure 5:
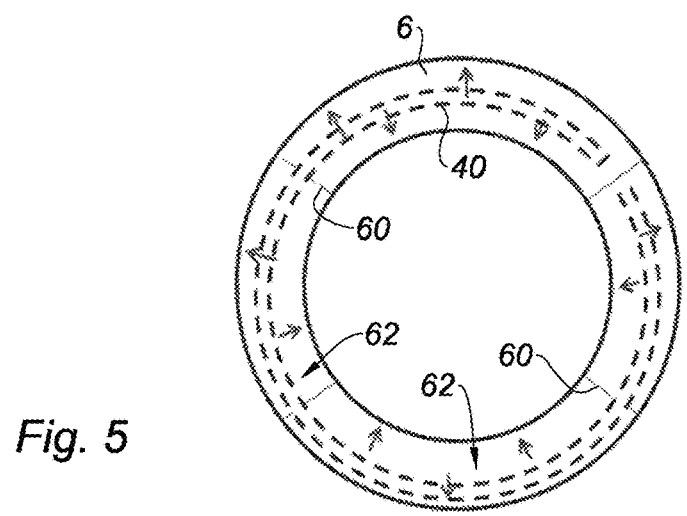
FIGS. 5 and 6 are front diagrams of two types of supply tubes of the front lip of FIG. 4.

FIG. 5 shows one single annular pierced tube 40, distributing the hot air evenly via different piercings inside a series of angular sectors 62 delimited by radial partition walls 60 separating the annular volume 4, which allows adjusting the flow rate inside each of these sectors independently.

Figure 6:
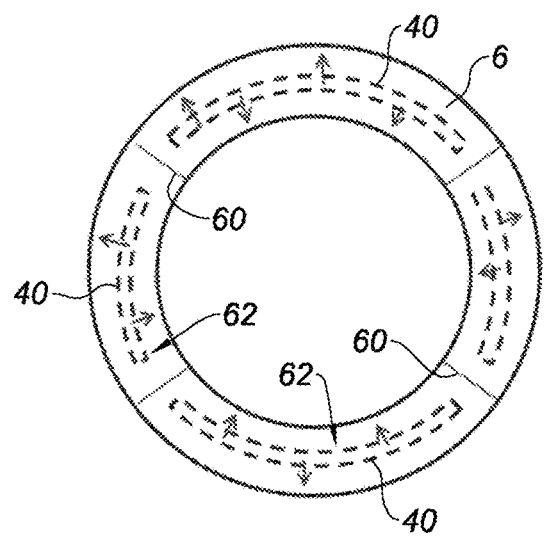

FIG. 6 shows the annular volume 4 separated into sectors 62 by radial partition walls 60, which are not crossed by pierced tubes 40 presenting several portions each located in one of the sectors.

For these last two versions including the annular volume 4 separated into sectors 62, it is possible in particular to adjust the number or the diameter of the piercings of the tube 40 opening into each of the sectors in order to obtain a homogeneous distribution of the hot air boundary layer 52.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A front lip of a turbojet engine nacelle, delimited at a rear portion by a partition wall, the front lip including a de-icing annular volume including a hot air supply tube for performing a de-icing of its external walls, the front lip further comprising acoustic panels, the acoustic panels including an internal wall that has a connection with the partition wall and a front wall extending from the internal wall toward a longitudinal axis of the nacelle, the front wall being disposed upstream from the partition wall, the front lip further comprising hot air outlet piercings disposed between a front end of the front lip and said acoustic panels, the hot air outlet piercings providing a hot air flow rate, from said annular volume, forming a substantially uniform film covering said acoustic panels with a boundary layer of air in order to heat the acoustic panels.

2. The nacelle front lip according to claim 1, wherein the hot air outlet piercings are disposed upstream of the acoustic panels.

3. The nacelle front lip according to claim 1, wherein the acoustic panels cover a majority of a length along the nacelle.

4. The nacelle front lip according to claim 1, wherein a surface of the front lip that does not include any acoustic panel, is heated by direct contact with hot air circulating inside the annular volume.

5. The nacelle front lip according to claim 1, wherein the annular volume is separated by internal radial partition walls into several angular sectors.

6. The nacelle front lip according to claim 5, wherein each angular sector includes a distinct supply tube.

7. A method for supplying with hot air an annular volume of a nacelle front lip according to claim 1, the method comprising adjusting a hot air flow rate delivered inside the annular volume based on operating conditions of a turbojet engine within the turbojet engine nacelle.

8. The hot air supply method according to claim 7, wherein during take-off of an aircraft having the turbojet engine, the method delivers a lower hot air injection flow rate.

9. The hot air supply method according to claim 7, wherein during descent of the aircraft having the turbojet engine, the method delivers a higher hot air injection flow rate.

10. A turbojet engine nacelle comprising a front lip presenting a de-icing annular volume receiving a hot air supply, wherein the front lip is made according to claim 1.

11. The nacelle front lip according to claim 1, wherein the internal wall is offset from an extension of the front end of the front lip.

12. The nacelle front lip according to claim 11, wherein the acoustic panels further include an external wall spaced apart from the internal wall and being in the extension of the front end of the front lip to define an aerodynamic continuity from the front end of the front lip.

13. The nacelle front lip according to claim 1, wherein the acoustic panels each include a honeycomb core.

* * * * *